United States Patent Office 2,837,496
Patented June 3, 1958

2,837,496

GRAFT COPOLYMERS AND PREPARATION THEREOF FROM POLYMER HYDROPEROXIDES

Edwin J. Vandenberg, Wilmington, Del., assignor to Hercules Powder Company, Wilmington, Del., a corporation of Delaware No Drawing. Application December 31, 1952
Serial No. 329,133

18 Claims. (Cl. 260—45.5)

This invention relates to the preparation of grafted polymers and, more particularly, to the preparation of such polymers by introducing hydroperoxide substituents onto a polymer chain and then decomposing the polymer hydroperoxide, under conditions that form free radicals on the polymer chain, in the presence of a monomer or monomers polymerizable by a free radical mechanism.

As is well-known, in a copolymer, produced by conventional polymerization processes, the monomeric units alternate in a regular or random manner, depending upon the monomers used and the polymerization process, and the properties of such copolymers are essentially an average of the properties of the corresponding homopolymers. It has recently been suggested that the properties of these polymers could be changed by "grafting" branches on to a polymer chain or backbone to produce a so-called "grafted" or "fishbone" polymer. By the proper selection of monomers, the backbone may be oil-soluble and the branches water-soluble, or vice versa, and the polymer will then be soluble in both water and organic solvents. One type of such grafted polymers has been produced by the condensation of ethylene oxide with a 98:2% styrene:vinyl alcohol copolymer, the latter having been prepared by hydrolysis of the corresponding styrene-vinyl acetate copolymer. Another type of grafted polymer has been produced by a chain transfer reaction involving polymerization of a monomer in the presence of a halogenated polymer. For example, vinyl acetate has been polymerized in the presence of a styrene-vinylidene chloride copolymer, the chlorine atoms acting as chain transfer points. In the same way, a copolymer of maleic ester and vinyl trichloroacetate has been prepared in which the chlorine atoms provided for the chain transfer capacity and styrene was then polymerized in its presence to produce a grafted polymer. The types of such grafted polymers that may be produced by these methods are, of course, quite limited, as are also the number of branches that may be grafted onto the polymer. Furthermore, when produced by the second method, i. e., the chain transfer mechanism, there is a great deal of homopolymer formed along with the grafted polymer.

Now, in accordance with this invention, a practical method of grafting side chains from free-radical-polymerizing monomers onto another polymer chain has been devised whereby there is produced not only a new type of grafted polymer but one containing a higher proportion of grafts than in the previous grafted polymers. It has been found that these grafted polymers may be prepared by placing the free radical source on the backbone polymer and then generating free radicals from the polymer in the presence of a monomer capable of being polymerized by a free radical mechanism.

The polymer hydroperoxides used in the preparation of the grafted polymers in accordance with this invention are conveniently prepared by the oxidation of an appropriate polymer. For example, polystyrene may be oxidized, preferably by cooxidation in cumene solution, to produce a polystyrene hydroperoxide, the number of hydroperoxide groups introduced into the polymer chain depending upon the degree of oxidation. In the same way, polyisopropyl-α-methylstyrene may be oxidized, either by cooxidation in cumene solution or by direct oxidation, to produce polyisopropyl-α-methylstyrene hydroperoxide, the hydroperoxide groups in this polymer being attached to the tertiary carbon of the isopropyl group rather than on the polymer carbon chain. The following preparations are typical of the methods used to produce these polymer hydroperoxides.

PREPARATION OF POLYSTYRENE HYDROPEROXIDE

Four hundred parts of a commercial polystyrene (a 1% solution in benzene having a specific viscosity of 1.47) was dissolved in 1600 parts of cumene and to this solution were added 20 parts of calcium hydroxide and 26.7 parts of 75% cumene hydroperoxide. Oxygen was bubbled through this reaction mixture held at 90° C. at the rate of about 4 cc./sec. until the iodometric hydroperoxide analysis indicated 30% cumene hydroperoxide (72 hours). The reaction mixture was then filtered to remove the insolubles and the polystyrene hydroperoxide was recovered by pouring the filtered solution into methanol with agitation. It was washed twice with methanol and then dried at room temperature in vacuo. In order to completely remove the cumene hydroperoxide from the polystyrene hydroperoxide, it was redissolved in benzene (20% concentration) and reprecipitated in methanol three times. The product so obtained on analysis was found to have 1.2% of the styrene units in the polymer converted to the corresponding tertiary hydroperoxide and had a specific viscosity (1% benzene solution) of 0.43.

In this and the following examples the hydroperoxide content of the polymer will be expressed as "percent substitution" or "percent substituted," i. e., the number of hydroperoxide groups per 100 oxidizable monomer units in the polymer.

For polystyrene hydroperoxides containing a lower percentage of hydroperoxide groups, the oxidation was stopped at a lower degree of oxidation. For example, when the oxidation was stopped at about 10% cumene hydroperoxide, there was obtained a polystyrene hydroperoxide containing 0.4–0.5% substitution and having a specific viscosity (1% benzene) of 1.02.

PREPARATION OF POLYISOPROPYL-α-METHYLSTYRENE HYDROPEROXIDE

The polyisopropyl-α-methylstyrene used was prepared by the low temperature acid polymerization of isopropyl-α-methylstyrene, the latter being a mixture of isomers in which the meta-isomer predominated.

The polyisopropyl-α-methylstyrene hydroperoxides used in Examples 26, 27 and 29–39 below were prepared by co-oxidation of polyisopropyl-α-methylstyrene in cumene substantially as described above for the preparation of polystyrene hydroperoxide. In this case, the polymer was found to oxidize much more readily than polystyrene. Only two precipitations were required to free it of cumene hydroperoxide. The time required for the oxidation at 90° C. and the percent hydroperoxides in the final polyisopropyl-α-methylstyrene hydroperoxide obtained at various degrees of oxidation (represented as percent cumene hydroperoxide in the final solution) are set forth below for three typical preparations.

| Hours at 90° C. | Total ROOH as percent cumene hydroperoxide | Percent substitution in polymer hydroperoxide | Specific viscosity (1% benzene) of polymer hydroperoxide |
|---|---|---|---|
| 24 | 2.9 | 2.7 | |
| 47 | 6.3 | 7.2 | 0.20 |
| 92 | 25.4 | 27.5 | 0.22 |

The polyisopropyl-α-methylstyrene hydroperoxide used in Examples 28 and 40–45 was prepared by the direct oxidation of a 25% solution of polyisopropyl-α-methylstyrene in tert-butyl benzene in the presence of 1% calcium hydroxide and 1% cumene hydroperoxide (based on the weight of solution). After 94 hours of oxidation at 90° C., the isolated and purified polyisopropyl-α-methylstyrene hydroperoxide was 6.3% substituted.

The following examples will illustrate the preparation of graft polymers in accordance with this invention.

*Example 1*

In this and Examples 2–39, inclusive, below, the polymerization was carried out at 40° C. using the following redox polymerization formula except for the variations as noted.

| | Parts |
|---|---|
| Polymer hydroperoxide | 100 |
| Monomer | 100–400 |
| Benzene | 200–1000 |
| Ferric acetylacetonate | 0.01 |
| Triethylamine | 0.5 |
| Benzoin | 1.0 |

In each case oxygen was completely removed from the polymerization system by evacuation and then pressuring the polymerization vessel with nitrogen. The percent conversion of the monomer to grafted polymer was calculated from the solids obtained on an aliquot.

In this example a grafted polymer was prepared from polystyrene hydroperoxide and acrylamide according to the above formula using 100 parts of acrylamide, 1000 parts of benzene, and 0.2 part of triethylamine. The polystyrene hydroperoxide used was 0.5% substituted and had a specific viscosity (1% benzene) of 1.02. After 22 hours at 40° C., the reaction mixture had become very viscous and turbid. The entire contents of the reaction vessel were well-dispersed. There was no evidence of any undispersed acrylamide, which initially was not completely soluble in the reaction medium. A total solids result on this product indicated that about 92% of the acrylamide had polymerized. The grafted polymer was precipitated by pouring it into well-agitated methanol. It was collected by filtration, washed twice with methanol and three times with water. After drying to constant weight, the product obtained represented 80% of that expected from the percent conversion of the acrylamide. On analysis it was found to contain 6.2% nitrogen which corresponds to 31% acrylamide. The grafted polystyrene-acrylamide polymer was insoluble in water, benzene (somewhat swollen), dimethylformamide, and formamide.

*Examples 2–23*

In these examples set forth in tabular form in Table I, the process and redox polymerization formula described in Example 1 were used with the variations as noted. The polystyrene hydroperoxide used was 1.2% substituted and had a specific viscosity (1% benzene) of 0.43. All of the polymerizations were carried out at 40° C.

TABLE I

| Ex. | Monomer | Parts | Parts C₆H₆ | Formula variations | Time, hrs. | Percent conversion | Benzene solution of polymer |
|---|---|---|---|---|---|---|---|
| 2 | Methyl acrylate | 100 | 1,000 | | 22 | 86 | Clear; viscous. |
| 3 | do | 400 | 1,000 | | 20 | Complete | Viscous; opalescent. |
| 4 | do | 100 | 520 | | 22 | do | Opalescent. |
| 5 | do | 200 | 520 | | 22 | do | Opalescent; fluorescent. |
| 6 | Methyl methacrylate | 200 | 190 | | 17 | do | Solid; opalescent. |
| 7 | do | 200 | 1,000 | | 20 | 60 | Clear; slightly viscous. |
| 8 | do | 400 | 1,000 | | 20 | 59 | Clear. |
| 9 | do | 200 | 520 | | 20 | 87 | Do. |
| 10 | do | 200 | 520 | No ferric acetyl acetonate | 20 | 34 | Slightly cloudy. |
| 11 | do | 200 | 520 | No amine | 20 | 29 | Do. |
| 12 | do | 200 | 520 | No benzoin | 144 | 78 | Viscous; clear. |
| 13 | {Methyl acrylate / Methyl methacrylate} | 100 / 100 | 520 | Temp. of 2° C | 18 | 95 | Viscous; turbid. |
| 14 | {Methyl acrylate / Allyl acetate} | 180 / 20 | 520 | | 18 | Complete | Viscous; opalescent. |
| 15 | Vinyl acetate | 200 | 1,000 | | 19 | 12 | Clear. |
| 16 | do | 400 | 1,000 | | 19 | 9 | Do. |
| 17 | do | 400 | 95 | | 20 | 14.5 | Slightly turbid. |
| 18 | Styrene | 100 | 1,000 | | 19 | 25 | Clear. |
| 19 | Acrylonitrile | 200 | 1,000 | | 21 | 61 | Yellow-green opalescence.[1] |
| 20 | Acrylamide | 100 | 1,000 | 10 parts nitrobenzene | 19 | Complete | Hazy. |
| 21 | do | 100 | 1,000 | 100 parts nitrobenzene | 19 | 70 | Less hazy. |
| 22 | do | 100 | 1,000 | 10 parts t-octyl mercaptan | 19 | Complete | Quite turbid; fluid. |
| 23 | Methacrylamide | 200 | 185 | 760 parts methyl ethyl ketone | 20 | 79 | Turbid; viscous.[2] |

[1] Polymer after isolation and drying was insoluble in benzene but soluble in dimethylformamide.
[2] Polymer after isolation and drying was insoluble in water.

*Example 24*

Example 5 was repeated except that the 1.2% substituted polystyrene hydroperoxide in this case had a specific viscosity (1% benzene) of 0.24. A complete conversion of the methyl acrylate was obtained. The solution of the polystyrene-methyl acrylate grafted polymer in benzene was viscous and turbid.

*Example 25*

Example 24 was repeated except that the monomer used was methyl methacrylate instead of methyl acrylate. A conversion of 68% was obtained and the solution of the grafted polystyrene-methyl methacrylate polymer in benzene was viscous and clear.

*Examples 26–37*

In these examples set forth in tabular form in Table II, grafted polymers of polyisopropyl-α-methylstyrene and various monomers were prepared using the same redox polymerization system described in the foregoing examples with the exceptions as noted. The polymer hydroperoxide used was polyisopropyl-α-methylstyrene hydroperoxide (called PIMSH in the table) of various hydroperoxide contents.

TABLE II

| Ex. | Percent substitution of PIMSH | Monomer | Parts | Parts C₆H₆ | Formula variations | Time, hrs. | Percent conversion | Benzene solution of polymer |
|---|---|---|---|---|---|---|---|---|
| 26 | 5.7 | Methyl methacrylate | 200 | 520 | 2 parts benzoin | 21 | 88 | Clear gel. |
| 27 | 5.7 | ___do___ | 200 | 1,000 | | 16 | 49 | Slightly viscous. |
| 28 | 6.3 | ___do___ | 200 | 5,000 | | 118 | 55 | Slightly cloudy. |
| 29 | 7.2 | ___do___ | 400 | 1,850 | 4 parts benzoin | 18 | 46 | Clear. |
| 30 | 7.2 | ___do___ | 400 | 1,850 | 4 parts benzoin, 2 parts triethylamine. | 18 | 56 | Do. |
| 31 | 7.2 | {Methyl methacrylate, Allyl acetate} | 400 / 400 | 1,850 | 2 parts benzoin | 44 | 50 | Viscous. |
| 32 | 7.2 | {Allyl acetate, Maleic anhydride} | 200 / 200 | 1,850 | ___do___ | 44 | 19 | |
| 33 | 5.2 | Methyl acrylate | 200 | 1,000 | ___do___ | 18 | 78 | Gel. |
| 34 | 5.2 | Methyl methacrylate | 200 | 1,000 | ___do___ | 18 | 51 | Clear. |
| 35 | 5.2 | ___do___ | 200 | 1,000 | No benzoin, 4 parts triethylamine. | 18 | 44 | Do. |
| 36 | 5.2 | t-Butyl acrylate | 200 | 1,000 | 2 parts benzoin | 18 | Complete | Gel. |
| 37 | 2.7 | Vinyl acetate | 200 | 500 | ___do___ | 18 | 37 | Clear. |

*Example 38*

Into a mixture of 100 parts of 5.2% substituted polyisopropyl-α-methylstyrene hydroperoxide, 200 parts of vinyl acetate, and 250 parts of benzene held at 40° C. was injected 250 parts of a methanol solution of a ferrous complex with ethylenedinitrilotetraacetic acid (1.1 ferrous ion per hydroperoxide group). The reaction mixture was solid in ½ hour. After 18 hours at the reaction temperature, the conversion was 59%. The grafted polyisopropyl-α-methylstyrene-vinyl acetate polymer was a gel, insoluble in benzene.

*Example 39*

One hundred parts of a 7.2% substituted polyisopropyl-α-methylstyrene hydroperoxide, 400 parts of methyl methacrylate, and 1850 parts of benzene were mixed and heated to 40° C. To this mixture was then added 250 parts of the same methanol solution of ferrous activator used in Example 38. At the end of 18 hours, the product was a solid gel.

*Examples 40-45*

In these examples the grafted polymers were prepared by thermal polymerization. In each case, 100 parts of a 6.3% substituted polyisopropyl-α-methylstyrene hydroperoxide was mixed with 200 parts of the monomer and from 400-5000 parts of benzene. The reaction vessel was evacuated to remove the oxygen and then pressured with nitrogen and heated to the specified reaction temperature. The conditions for each example are set forth in Table III and the solubility of the grafted polymer in benzene is indicated. In Examples 41-44, a control run was made wherein the polyisopropyl-α-methylstyrene hydroperoxide was omitted but all other conditions were identical. In each case, the control gave only a very slight conversion of the monomer. Iodiometric analysis of an aliquot of the polymerizations carried out in the presence of the polyisopropyl-α-methylstyrene hydroperoxide indicated that 75% of the hydroperoxide was decomposed in the preparation of the grafted polymer.

methylstyrene prepared as described above. Examples 46-50 will illustrate the preparation of these graft polymers.

*Example 46*

The graft polymer of polystyrene and methyl acrylate prepared in Example 2 contained 16.3% oxygen which corresponds to 44% methyl acrylate. It was soluble in benzene and had a specific viscosity (1% benzene) of 0.64.

This methyl acrylate graft was saponified to the sodium salt by refluxing a mixture of 7.2 parts of it, 500 parts of ethanol, and 4 parts of sodium hydroxide dissolved in 30 parts of water for 1 hour, after which 500 parts of water was added and the refluxing continued for 21 hours. The product was insoluble in the reaction medium. It was collected by filtration, washed twice with water, and then dried in vacuo (16 hours at room temperature and 7 hours at 80° C.). The polystyrene containing sodium acrylate graft, so prepared, had a microsulfate ash of 28.1% (theory for the completely saponified product is 36%). It was insoluble in benzene, benzene plus acetic acid, water, 40% aqueous potassium hydroxide, and aqueous acetic acid, whereas both polymethyl acrylate and a normal 1:1 methyl acrylate-styrene copolymer, when saponified under the same conditions, yield water-soluble products.

*Example 47*

The methyl acrylate-polystyrene graft prepared in Example 3 was a tough, fibrous polymer which was soluble in benzene and had a specific viscosity (1% benzene) of 2.58. Ten parts of it was saponified according to the procedure described in Example 46. The saponification product was insoluble in the reaction mixture. It was separated by filtration, washed several times with ethanol, in which it was insoluble, and dried. This sodium acrylate-polystyrene graft swelled enormously in water; an 0.01-0.02% suspension was quite viscous with a large

TABLE III

| Ex. | Monomer | Parts C₆H₆ | Temp., °C. | Time, hrs. | Percent conversion | Solubility of polymer in C₆H₆ |
|---|---|---|---|---|---|---|
| 40 | Methyl methacrylate | 5,000 | 90 | 22 | 55 | Soluble. |
| 41 | ___do___ | 1,000 | 90 | 22 / Control | Complete / 7 | Do. |
| 42 | ___do___ | 1,000 | 116 | 22 / Control | Complete / 18 | Do. |
| 43 | ___do___ | 1,000 | 140 | 5 / Control | 84 / 5 | Do. |
| 44 | ___do___ | 400 | 140 | 6 / Control | 80 / 19 | Do. |
| 45 | Methyl acrylate | 400 | 140 | 1 | Solid | Gel (insoluble). |

Graft polymers of acrylic or methacrylic acid and polystyrene or polyisopropyl-α-methylstyrene may be prepared by hydrolyzing the graft polymers of acrylic or methacrylic esters and polystyrene or polyisopropyl-α- number of gel-like particles present. Smooth, turbid, and very viscous solutions (1-5%) could be obtained in water by agitating in a high speed blender. Such solutions dried to hard, clear films. This graft polymer was an excellent paper-coating adhesive and oil well drilling mud additive.

Example 48

The methyl methacrylate-polystyrene graft polymer prepared in Example 7 was soluble in benzene. It was saponified according to the procedure described in Example 46 except that no water was added to the system. The saponification product so obtained was insoluble in benzene or ethanol but was completely soluble in a 1:2 mixture of ethanol and benzene, whereas benzene is a solvent for polystyrene hydroperoxide and ethanol is a solvent for sodium methacrylate. This solubility behavior demonstrates that a true graft was formed and that it was not cross-linked. The saponification product was insoluble in water but gave foam stabilization when shaken in water. Polymethyl methacrylate, when hydrolyzed under the same conditions, yielded a water-soluble product.

Example 49

The methyl methacrylate-polyisopropyl-α-methylstyrene graft polymer prepared in Example 27 was soluble in benzene. When hydrolyzed according to the procedure of Example 48, the product was insoluble in benzene or ethanol but was soluble in a mixture of these solvents. It appeared to be at least partly water-soluble as it gave very good foam stabilization on shaking in water.

Example 50

The methyl methacrylate-polyisopropyl-α-methylstyrene graft polymer prepared in Example 40 was soluble in benzene. When hydrolyzed according to the procedure described in Example 48, a colloidal dispersion of the hydrolysis product in the hydrolysis medium was obtained. The solvent was, therefore, removed under water pump vacuum at room temperature. The product so obtained was dissolved and/or colloidally dispersed on warming with water. This suspension exhibited foam stabilization on shaking.

The following examples will illustrate a number of other variations that may be made in the preparation of graft polymers in accordance with this invention as well as the preparation of graft polymers from other types of polymer hydroperoxides.

Example 51

The polyisopropyl-α-methylstyrene hydroperoxide used in this example was 26.3% substituted and had a specific viscosity of 0.07 (1% benzene). It was prepared from a polymer made by polymerizing a 2:1 mixture of meta- and para-isopropyl-α-methylstyrenes. Two parts of this polyisopropyl-α-methylstyrene hydroperoxide and 10 parts of allyl amine were charged into a polymerization vessel and the air was evacuated. After 20 hours at room temperature, analysis of an aliquot showed that all of the hydroperoxide was decomposed. The product was recovered by precipitating it in 50 parts of water and separation of the precipitate by filtration. After drying in vacuo for 16 hours at 80° C., it amounted to 1.9 parts. On analysis this graft polymer was found to contain 1.5% nitrogen which corresponds to 6.1% allyl amine in the final product.

Example 52

The polyisopropyl-α-methylstyrene hydroperoxide (PIMSH) used was 6.6% substituted and had a specific viscosity of 0.18 (1% benzene). It was prepared from a polymer obtained by polymerization of a 1:1 mixture of meta- and para-isopropyl-α-methylstyrene.

The following ingredients were charged into a polymerization vessel, air was removed, and the reaction mixture was then heated at 65° C. for 18 hours.

|  | Parts |
|---|---|
| PIMSH | 50 |
| Methyl methacrylate | 100 |
| Benzene | 443 |
| Benzoin | 4.0 |
| Triethylamine | 0.25 |
| Ferric acetylacetonate | 0.01 |
| Commercial mixture of cyclic terpenes | 3.33 |

The methyl methacrylate was completely polymerized and the product was a clear, fairly fluid solution at reaction temperature. The isolated graft polymer had a specific viscosity of 0.51 (1% benzene).

When the polymerization was carried out in the absence of the retarder (the mixture of cyclic terpenes), a gel was obtained indicating that cross-linking occurred.

Example 53

A copolymer of p-isopropyl-α-methylstyrene and methacrylic acid was prepared by copolymerization of the two monomers in a 1:3 mole ratio in benzene solution at 65° C. using benzoyl peroxide as the catalyst. After 19 hours, the copolymer had precipitated out to make the entire reaction mixture a solid mass. The copolymer was collected by filtration, washed with benzene, and dried. It was insoluble in water, but was soluble in dilute alkali and ethanol. It had a specific viscosity of 0.27 (1% ethanol) and an acid number of 415 (theory for methacrylic acid is 652). Based on the acid number, the copolymer contained 36.3% p-isopropyl-α-methylstyrene.

This p-isopropyl-α-methylstyrene-methacrylic acid copolymer was oxidized by bubbling oxygen through a solution comprising 7.91 parts of the copolymer, 2.60 parts of sodium hydroxide, 21.1 parts of tert-butyl alcohol, 0.38 part of potassium persulfate, and 55.6 parts of water at 65° C. for 43 hours. The reaction mixture was then diluted with about 60 parts of an 80:20 water:tert-butyl alcohol mixture and the product was precipitated by adding about 20 parts of glacial acetic acid. About 300 parts of water was added and the gelatinous precipitate was centrifuged out. The precipitate was resuspended in water, recentrifuged, filtered to a paste, washed with water, and finally dried. An iodometric analysis of the product showed it to have 4.1% of its p-isopropyl aryl groups converted to hydroperoxide. A graft of this hydroperoxide of p-isopropyl-α-methylstyrene-methacrylic acid copolymer and styrene was prepared using the following polymerization formula:

|  | Parts |
|---|---|
| Copolymer hydroperoxide | 2.00 |
| Styrene | 2.00 |
| Water | 13.4 |
| Sodium hydroxide | 0.60 |
| Ferric iron (calculated as Fe but added as sulfate) | 0.00017 |
| Sodium pyrophosphate | 0.015 |
| Dextrose | 0.10 |

All of the ingredients except the dextrose and 2 parts of water were charged to a polymerization vessel, the air in the vessel was replaced with nitrogen, and after heating the mixture to 30° C., the dextrose in water was injected. A very rapid polymerization took place, the reaction mixture barely flowing after 1 hour. At 2 hours, a solids sample showed that the styrene was 99% polymerized. The product was a very viscous, turbid solution. It was readily diluted with water to give an opalescent solution which showed definite foam stabilization. It also gave an opalescent solution when diluted with methanol. In neither case were any visible particles of polystyrene present, demonstrating that true graft polymer formation had occurred.

Example 54

A graft of the hydroperoxide of p-isopropyl-α-methylstyrene-methacrylic acid copolymer, prepared as described in Example 53, and acrylamide was prepared using the same polymerization formula as in Example 53 except that 4.00 parts of acrylamide and three times as much water were used. The polymerization was carried out as in that example at 30° C. After 5 hours the reaction mixture was a very viscous, clear solution and a solids on an aliquot showed that the acrylamide was completely polymerized.

Example 55

A copolymer of p-isopropyl-α-methylstyrene and maleic anhydride was prepared by charging the following ingredients into a sealed polymerization vessel in the absence of air and heating the mixture to 65° C.

|  | Parts |
|---|---|
| p-Isopropyl-α-methylstyrene | 20.0 |
| Maleic anhydride | 12.3 |
| Benzene | 129.0 |
| Benzoyl peroxide | 0.16 |

At the end of 21.5 hours, a taffylike lower layer had separated. The reaction mixture was made homogeneous by adding 150 parts of acetone. The copolymer was recovered by adding the reaction mixture solution to 2000 parts of n-pentane with agitation. After washing the precipitate twice with n-pentane, it was vacuum-dried. This copolymer was insoluble in benzene, ethanol, and dilute aqueous sodium hydroxide, and was soluble in acetone, methyl ethyl ketone, and dioxane. It had a specific viscosity of 0.36 (1% methyl ethyl ketone).

The above copolymer was hydrolyzed in order to convert it into its sodium salt which is water-soluble. This was done by adding aqueous sodium hydroxide to an acetone solution of the copolymer and finally water. The hydrolyzed polymer was recovered by acidifying the solution with concentrated hydrochloric acid, filtering, washing with water, and drying. The hydrolyzed copolymer was soluble in ethanol, dilute aqueous sodium hydroxide, and acetone.

The hydrolyzed p-isopropyl-α-methylstyrene-maleic anhydride copolymer was oxidized by bubbling oxygen through a solution comprising 10.0 parts of the polymer, 3.1 parts of sodium hydroxide, 0.20 part of potassium persulfate, and 86.9 parts of water at 90° C. Iodometric analysis of aliquots showed the following rate of hydroperoxide formation:

| Time, hours | Percent substitution of isopropyl groups by hydroperoxy groups |
|---|---|
| 17.3 | 2.1 |
| 42 | 3.3 |
| 73.5 | 7.3 |

A graft of this hydroperoxide (7.3% substituted) of the hydrolyzed p-isopropyl-α-methylstyrene-maleic anhydride copolymer was prepared using the following polymerization formula:

|  | Parts |
|---|---|
| The above aqueous solution of polymer hydroperoxide | 5.00 |
| Water | 15.8 |
| Acrylonitrile | 2.0 |
| Ferric iron (calculated as Fe but added as sulfate) | 0.00017 |
| Sodium pyrophosphate | 0.015 |
| Dextrose | 0.10 |

The ingredients were charged to a polymerization vessel, air was removed, and the contents were heated to 65° C. for 20 hours. The acrylonitrile was 50% polymerized. The product was a turbid, fluid solution. The particle size was in the colloidal range. The solution exhibited foam stabilization. There was no precipitation when the solution of the graft polymer was diluted with water, methanol, or acetic acid.

Example 56

A copolymer of p-isopropyl-α-methylstyrene and isobutylene was prepared by cooling a mixture of about 30 parts of each and 240 parts of toluene in a polymerization vessel to −79° C. and adding 0.68 part of boron trifluoride during one hour to the stream of nitrogen passing through the reaction mixture. The temperature was maintained at −76° C. ±3° C. and after 1.5 hours, 10 parts of methanol was added. The reaction mixture was then poured into 3000 parts of methanol with agitation. The precipitated copolymer was collected by filtration, washed twice with methanol, and dried. It was a solid with a somewhat elastic nature and had a specific viscosity of 0.19 (1% benzene). An ultraviolet absorption showed that true copolymerization had occurred.

This copolymer was oxidized by passing oxygen through a reaction mixture comprising 50 parts of the copolymer, 167 parts of tert-butyl benzene, 0.25 part of cumene hydroperoxide initiator, and 0.5 part of calcium hydroxide base stabilizer at 110° C. After 16.5 hours, 12.1% of the isopropyl aryl groups was converted to the corresponding tertiary hydroperoxide.

A graft polymer of this p-isopropyl-α-methylstyrene-isobutylene copolymer hydroperoxide and methyl acrylate was prepared using the redox polymerization formula set forth in Example 1 and carrying out the polymerization at 40° C. for 20 hours.

Example 57

Oxygen was bubbled through a mixture of 30 parts of a commercial polyethylene (mol. wt.=7000) and 120 parts of tert-butyl benzene containing 1.5 parts of dicumene peroxide initiator at 110° C. for 46 hours. Analysis showed that hydroperoxide groups had formed to the extent of 0.46% substitution. The product was precipitated by adding the hot reaction mixture to 1500 parts of methanol with agitation. It was separated by filtration, washed with methanol, dried, and then further purified by dissolving it in 135 parts of hot benzene and reprecipitating by pouring the hot solution into 1500 parts of methanol. It was again separated by filtration, washed twice with methanol, and dried. On analysis it was found to be 0.26% substituted.

A graft polymer was prepared from this polyethylene hydroperoxide and vinyl acetate using the following redox polymerization formula:

|  | Parts |
|---|---|
| Polyethylene hydroperoxide | 25 |
| Vinyl acetate | 100 |
| Benzene | 250 |
| Ferric acetylacetonate | 0.005 |
| Benzoin | 0.25 |
| Triethylamine | 0.12 |

The polymerization was carried out at 65° C. for 72 hours. A 54% conversion of the vinyl acetate was obtained. The reaction mixture was very viscous.

Example 58

Oxygen was bubbled through a solution of 10 parts of polypropylene (specific viscosity, 1% benzene, =0.17) in 20 parts of tert-butyl benzene containing 1.0 part of dicumene peroxide and 0.20 part of sodium carbonate at 110° C. for 43 hours. The product was recovered by precipitating it in 300 parts of methanol. The taffylike solid was vacuum-dried for 19 hours at room temperature. On analysis it was found to be 0.15% substituted.

A graft polymer was prepared from this polypropylene hydroperoxide and methyl acrylate using the same polymerization formula as in Example 57 except for the substitution of this hydroperoxide and monomer. The polymerization was carried out at 40° C. for 17.5 hours. The methyl acrylate was 17% polymerized.

The graft polymers of this invention are prepared by introducing hydroperoxide groups into a polymer chain and then decomposing those hydroperoxide groups, under conditions that form free radicals on the polymer chain, in the presence of one or more monomers capable of being polymerized by a free radical mechanism. That the polymers so obtained are true graft polymers and not physical mixtures of the respective polymers may be demonstrated in several ways. Many of the polymers are cross-linked polymers and as the hydroperoxide content of the polymer hydroperoxide increases, the tendency to form insoluble cross-linked polymers is increased. The formation of cross-linked polymers is, in itself, good evidence of the formation of true graft polymers. The solubility characteristics of these polymers also demonstrate that they are graft polymers since they frequently demonstrate solubilities that neither of the respective polymers has.

Saponification of the polymer hydroperoxide grafts with methyl acrylate and methyl methacrylate not only produced grafts containing acid groups in the form of salts but demonstrated that true grafts had been formed. Saponification of the polystyrene-methyl acrylate graft polymers of Examples 2 and 3 shows that as the methyl acrylate content of the graft polymer was increased, the saponified product swelled increasingly in water but was either water-insoluble or gave turbid, viscous solutions. In fact, the saponified grafts were insoluble in organic solvents also, whereas the unsaponified graft polymers were soluble in benzene. On the other hand, hydrolysis of the polystyrene-methyl methacrylate graft polymer of Example 7 yielded a polymer which was neither water-soluble nor highly swollen in water, but which was soluble in approximately equal mixtures of benzene and ethanol. It was not soluble in either of the latter solvents alone, whereas benzene is a solvent for polystyrene hydroperoxide and ethanol is a solvent for sodium methacrylate. This solubility behavior clearly demonstrates that a true graft was formed and furthermore that it was not cross-linked. In the case of the grafts prepared from poly-isopropyl-α-methylstyrene and methyl methacrylate as in Examples 27 and 40 (the hydrolysis of which was shown in Examples 47 and 50), hydrolysis to the sodium salt yielded products which were soluble in ethanol-benzene mixtures and which also have a substantial water-soluble fraction. This partial water solubility was demonstrated by the foam stabilization exhibited in water and that they could be fairly well-dispersed in water.

The formation of a true graft from polystyrene hydroperoxide and vinyl acetate was shown by twice precipitating the polymer produced in Example 15 from a benzene solution of it with ethanol and then analyzing the product for oxygen. It contained 2.8% oxygen which corresponds to 7.5% vinyl acetate. Since polyvinyl acetate is soluble in ethanol, the polymer was, therefore, not a mixture of polystyrene and polyvinyl acetate, but was a true graft polymer of polystyrene and vinyl acetate.

Further proof that these polymers are true grafts and not physical mixtures of polymers was demonstrated in the case of the polystyrene hydroperoxide-acrylonitrile graft of Example 19. This polymer was initially dispersed in benzene, whereas after isolation and drying of the polymer, it could not be redispersed in benzene. It was dispersible in dimethylformamide, but gave a turbid solution, whereas both polystyrene and polyacrylonitrile are soluble in this solvent. Here, again, the solubility characteristics demonstrate the formation of a graft polymer.

The polymer hydroperoxides used in the preparation of the graft polymers in accordance with this invention may be prepared in a variety of ways, the method used depending, in general, upon the type of polymer from which they are prepared. The preferred method of introducing hydroperoxide groups into a polymer is by oxidation of the polymer with a gas containing free oxygen. This may be done by passing oxygen or any gas containing free oxygen into a solution of the polymer in an inert solvent such as benzene, tert-butylbenzene, water, etc. In some cases, as, for example, polystyrene, which is more difficultly oxidized, it is desirable to carry out the oxidation in an oxidizable solvent such as cumene, the hydroperoxide groups being more readily introduced into the polystyrene by this co-oxidation procedure. In carrying out the oxidation either by direct oxidation or co-oxidation, it is frequently desirable to add a small amount of an initiator. Any free radical-generating agent may be used, as, for example, a hydroperoxide such as cumene hydroperoxide, p-menthane hydroperoxide, etc., a peroxide such as dicumene peroxide, benzoyl peroxide, etc., or any other oxidation initiator. It may also be desirable to add a base stabilizer such as calcium hydroxide, sodium bicarbonate, sodium carbonate, etc. The oxidation to the peroxide may be carried out at a temperature of from about 20° C. to about 200° C., and preferably from about 60° C. to about 140° C. If the oxidation is carried out in an inert solvent, it may not be necessary to purify the polymer hydroperoxide prior to its use in the preparation of the graft polymer. However, when the polymer hydroperoxide is prepared by a co-oxidation procedure, it is then preferable to remove the low molecular weight hydroperoxide by precipitation, countercurrent extraction, or some other desirable means.

As may be seen from the foregoing examples, polystyrene itself may be oxidized to produce a polystyrene hydroperoxide, or a substituted polystyrene such as poly-isopropyl-α-methylstyrene may be oxidized, in the latter case the oxidation taking place on the tertiary carbon of the isopropyl group. The examples have also illustrated the preparation of other polymer hydroperoxides as well as hydroperoxides of various copolymers. Any polymer containing an oxidizable hydrogen atom may be oxidized to a polymer hydroperoxide. Thus, any polymer of a monomer containing a vinyl or vinylene group contains a hydrogen attached to a tertiary carbon of the polymer chain, which hydrogens may be oxidized to hydroperoxy groups. Such polymers may also contain oxidizable secondary or tertiary hydrogens attached to the side chains in the polymer chain. On the other hand, a polymer of a vinylidene monomer, which does not contain an oxidizable hydrogen attached to the polymer chain, will be oxidizable if there is a secondary or tertiary hydrogen attached to the side chain, as, for example, poly-p-ethyl-α-methylstyrene which contains a secondary hydrogen in the ethyl group attached to the aromatic ring, or poly-p-isopropyl-α-methylstyrene which contains a tertiary hydrogen in the isopropyl group attached to the aromatic ring, both of which hydrogens may be oxidized to hydroperoxy groups. While the homopolymers of many monomers such as methyl methacrylate, methacrylamide, methacrylonitrile, vinylidene chloride, etc., do not contain oxidizable hydrogens, copolymers of such monomers with vinyl or vinylidene comonomers or vinylidene comonomers containing oxidizable secondary or tertiary hydrogens are capable of being oxidized to polymer hydroperoxides.

Exemplary of the polymers containing oxidizable hydrogens that may be so oxidized to polymer hydroperoxides are the polymers prepared from such monomers as olefins such as ethylene; propylene; butylene; styrene; p-ethylstyrene; p-isopropylstyrene; p-cyclohexylstyrene; p-methylstyrene; isopropyl-α-methylstyrene; p-cyclohexyl-α-methylstyrene; p-methyl-α-methylstyrene; vinyl pyridine; isopropyl vinyl pyridine; isopropyl vinyl naphthalenes; vinyl ethers of alcohols such as those of methanol, butanol, dehydroabietyl alcohol, p-isopropylbenzyl alcohol, etc.; vinyl esters of such acids as p-isopropylbenzoic acid, etc.; methyl vinyl ketone; etc. Substituted derivatives of these polymers may be oxidized also; as, for example, chloro-, nitro-, methyl-, tert-butyl-, carboxyl-, cyano-, acetyl-, etc., substituted polystyrenes, etc., may be oxidized. Exemplary of the latter group are the polymers of such monomers as p-chlorostyrene, p-nitrostyrene, p-acetylstyrene, 3-chloro-5-isopropyl-α-methylstyrene, 3-cyano-5-isopropyl-α-methylstyrene, 2-isopropyl-4-carboxy-6-isopropylnaphthalene, etc. Another group of polymers which may be oxidized to polymer hydroperoxides are those obtained by reducing, at least in part, the aromatic ring to the substituted cyclohexane in the polymers obtained from the following monomers or their homologs: styrene, p-methylstyrene, α-methylstyrene, p-methyl-α-methylstyrene, etc. In addition, the polymers which are oxidized may be copolymers of a monomer which is more readily oxidized with a monomer which does not yield a readily oxidized polymer by itself, as, for example, copolymers of styrene or substituted styrenes, etc., with such monomers as acrylonitrile, methacrylonitrile, vinyl chloride, isobutylene, vinyl acetate, maleic anhydride, methyl acrylate, methyl methacrylate, acrylic acid, methacrylic acid, acrylamide, methacrylamide, sodium vinyl sulfonate, etc. Polymers which may be subjected to this air oxidation may also be obtained by alkylating already formed polymers containing aromatic rings, such as polystyrene, with propylene, cyclohexene, etc. Many condensation polymers may also be oxidized to the polymer hydroperoxide, as, for example, a polyester or polyamide prepared from an isopropyl aryl dibasic acid such as isopropylphthalic acid or from a saturated dibasic acid obtained by reaction of terpenes with maleic anhydride, followed by hydrogenation, etc.

In addition to preparing the polymer hydroperoxides by air oxidation, other methods of obtaining these polymer hydroperoxides may be used. For example, polymers containing ketone groups such as the polymers or copolymers obtained from methyl isopropenyl ketone, methyl vinyl ketone, p-acetylstyrene, etc., may be reacted with hydrogen peroxide to yield hydroxy hydroperoxides. In the same way, polymers containing alcohol groups such as polyvinyl alcohol may be reacted with hydrogen peroxide in the presence of sulfuric acid to yield a polymeric hydroperoxide.

The amount of hydroperoxide groups introduced into the polymer may be varied from 0.1–80% of the theoretical amount, 0.5–40% usually being preferred. The molecular weight of the polymer hydroperoxide may be varied from that of several monomer units up to many thousand monomer units but usually the polymer is one containing from 20–1000 monomer units.

The term "polymer" as used in this specification and the claims appended hereto is used in the generic sense and includes both homopolymers and copolymers.

As pointed out above and demonstrated by the examples, the graft polymers are prepared by decomposing a polymer hydroperoxide under such conditions as will yield free radicals on the polymer chain in the presence of one or more monomers capable of being polymerized by a free radical mechanism. Any monomer or comonomer which polymerizes by a free radical mechanism may be used to introduce the grafts onto the polymer chain. Exemplary of the monomers which may be used as grafts are styrene and alkyl-substituted styrenes such as α-methylstyrene, etc., olefins and diolefins such as ethylene and butadiene, esters of unsaturated acids such as the methyl, ethyl, etc., esters of acrylic, methacrylic, and α-chloroacrylic acids, unsaturated nitriles such as acrylonitrile, methacrylonitrile, etc., unsaturated halides such as vinyl chloride, vinylidene chloride, etc., vinyl esters such as vinyl acetate, etc., vinyl ethers, vinyl pyridine, and other vinyl compounds, allyl compounds such as allyl acetate, alcohol, chloride, methallyl acetate, allyl amine, etc., ethylene maleate, maleic anhydride, acrylamide, methacrylamide, diethylaminoacrylamide, diethylaminoethyl acrylate, sodium vinyl sulfonate, etc. The amount of the monomer or comonomer which is reacted with the polymer hydroperoxide may be varied over a wide range but, in general, from about 5 to about 100,000 parts of monomer is used per 100 parts of polymer hydroperoxide, preferably from about 20 to about 10,000 parts per 100 parts of polymer hydroperoxide is used, and more preferably from about 50 to about 500 parts per 100 parts of polymer hydroperoxide is used.

The polymer hydroperoxide may be decomposed so as to form free radicals on the polymer chain in the presence of the monomer by either a thermal or redox polymerization system. For example, the mixture of polymer hydroperoxide and monomer may be heated either in a bulk, solution, suspension, or emulsion mixture whereby the polymer hydroperoxide is decomposed and yields free radicals on the polymer chain to which the monomer is then grafted. The temperature at which this thermal polymerization may be carried out will be any temperature of from about 20° C. to about 200° C., preferably from about 50° C. to about 200° C., and more preferably from about 90° C. to about 160° C.

Another method that may be used to decompose the polymer hydroperoxide into free radicals, in the presence of the monomer, is to add a redox reducing agent, i. e., carry out the polymerization in a redox system. As is well-known, a redox polymerization system is one in which a reducing agent is added to aid the formation of free radicals from the polymerization catalyst. Such polymerizations may be carried out by bulk, solution, suspension, or emulsion polymerization techniques and the reducing agent added will depend upon the type of polymerization technique being used. Any of the reducing agents used in redox polymerization may be used to decompose the polymer hydroperoxide into free radicals. By the term "redox reducing agent" as used in this specification and the claims appended hereto is meant any of the reducing agents known in the art for use in redox polymerization systems. Typical of such redox reducing agents are the salts or complexes of metals capable of existing in more than one valence state and which are preferably in a reduced oxidation state. Exemplary of such redox reducing agents are ferrous pyrophosphate, ferrous sulfide, the ferrous complex of ethylenedinitrilotetraacetic acid, ferrous o-phenanthroline, ferrous or ferric acetylacetone, ferrocyanide, etc., and the corresponding cobalt, nickel, copper, mercury, chromium, manganese, etc., compounds. These redox reducing agents may be used alone or in combination with other reducing agents such as an α-hydroxycarbonyl compound or a compound behaving as such, as, for example, fructose, glucose, acetylacetone, ascorbic acid, acetoin, benzoin, etc. They may also be used in combination with ammonia, amines, hydrazine, phenylhydrazine, etc. Another type of redox reducing agents that may be used are polyamines, as, for example, diethylenetriamine, triethylenetetramine, tetraethylenepentamine, etc. Other reducing agents that may be used are monoamines, sodium hyposulfite, mercaptans, hydrazine, phenyl hydrazine, etc. The choice of the redox reducing agent will, of course, depend upon the polymerization medium and the solubility of the agent in the medium, the temperature, etc. In general, the redox polymerization will be carried out at a temperature of from about —50° C. to about 140° C., and preferably from about —20° C. to about 100° C.

In the preparation of the graft polymers from the polymer hydroperoxides and monomers, there is frequently a strong tendency to form a cross-linked graft polymer, this tendency depending largely upon the type of monomer being grafted onto the polymer. Although certain cross-linked graft polymers are useful and, in fact, desirable in many applications, there are many applications such as emulsifiers, surface active agents, etc., which require substantially soluble products and particularly water-soluble products. In the case of monomers such as acrylamide and methacrylamide which terminate their polymerization by radical combination, i. e., two growing chains combining, the cross-linking during the polymerization may be prevented by the addition of polymerization retarders to the graft polymerization system. This was demonstrated in Examples 20 and 21 wherein nitrobenzene was added as a retarder and the solubility of the graft polymer was increased with increasing amounts of retarder added and in Example 52 wherein cyclic terpenes were added as a retarder. The type of polymerization retarder which should be added to prevent cross-linking will depend, to a large extent, upon the monomer being used. For example, a retarder for vinyl acetate polymerization will not necessarily work for methyl acrylate, etc. The choice of retarder to be added should then be chosen as one which is operable with the monomer being grafted onto the polymer. Polymerization retarders which may be used in the process of this invention to prevent cross-linking during polymerization are aliphatic and aromatic nitro compounds, quinone, hydroquinone, phenols, olefins, terpenes, aldehydes, aromatic hydrocarbons, aliphatic and aromatic amines, allyl compounds, sulfur compounds such as mercaptans, sulfides, and disulfides, organic halides, etc. Another method for preventing the cross-linking during polymerization of the polymer hydroperoxide and monomer is by using as the monomer a vinyl monomer which is somewhat sterically hindered at the $\alpha$-carbon atom so that normal propagation occurs but radical combination is prevented or minimized. Among such monomers which are so sterically hindered are $\alpha$-tert-butyl acrylate, hydroabietyl acrylate, vinyl naphthalene, N-isobornyl acrylate, $\alpha$-tert-butyl acrylonitrile, vinyl tetrahydroabietate, etc. Another method for preventing or minimizing cross-linking during the reaction is to use a polymer hydroperoxide containing a low number of hydroperoxide groups per polymer chain, for example, a polymer hydroperoxide containing between 1 and 2 hydroperoxide groups per polymer chain.

The graft polymers produced in accordance with this invention fall into three broard classes: (1) those which contain polar and nonpolar units, (2) those which are substantially nonpolar, and (3) those which are substantially polar. The first group may or may not be water-soluble or water-dispersible but are useful as emulsifiers, protective colloids, surface active agents, detergents, wetting agents, paper sizes, paper-coating agents, paper wet strength resins, textile sizes, antistatic agents, foaming agents, oil additives, etc. The second group may be used as plasticizers, film formers, fibers, and elastomers. In this category, the cross-linked polymers are frequently advantageous. In many cases, the cross-links are long ones and the products are then thermoplastic and capable of being molded or extruded. The third group may be used as protective colloids, paper-coating agents, paper wet and dry strength agents, oil well drilling muds, etc. A particularly interesting type of this third group of graft polymers are those containing both acidic and basic groups and hence exhibit amphoteric properties. For example, grafts of vinyl pyridine, diethylaminoethyl acrylate, etc., on backbone polymers such as the hydroperoxide of a p-isopropyl-$\alpha$-methylstyrene-acrylic acid or methacrylic acid copolymer have large areas of both acidic and basic groups. Thus, it may be seen that graft polymers having a wide variety of properties may be prepared in accordance with this invention.

What I claim and desire to protect by Letters Patent is:

1. The process of preparing a graft copolymer which comprises polymerizing a polymerizable ethylenically unsaturated monomer in the presence of a polymer hydroperoxide, said polymer hydroperoxide being the only free radical initiator present in the polymerization mixture and said polymer hydroperoxide being the hydroperoxide of a polymer of a vinylidene compound and containing at least about 20 monomer units.

2. The process of claim 1 wherein the polymerization process is carried out at a temperature of from about 20° C. to about 200° C.

3. The process of claim 1 wherein the polymerization process is carried out in the presence of a compound of a metal capable of existing in more than one valence state and a reducing agent.

4. As a new composition of matter, the product produced by the process of claim 1.

5. The process of preparing a graft copolymer of a polystyrene and a polymerizable ethylenically unsaturated monomer which comprises polymerizing said ethylenically unsaturated monomer in the presence of a polystyrene hydroperoxide, said polystyrene hydroperoxide being the only free radical initiator present in the polymerization mixture and containing at least about 20 monomer units.

6. As a new composition of matter, the product produced by the process of claim 5.

7. The process of preparing a graft copolymer of an isopropyl-$\alpha$-methylstyrene polymer and a polymerizable ethylenically unsaturated monomer which comprises polymerizing said ethylenically unsaturated monomer in the presence of an isopropyl-$\alpha$-methylstyrene polymer hydroperoxide, said polymer hydroperoxide being the only free radical initiator present in the polymerization mixture and containing at least about 20 monomer units.

8. As a new composition of matter, the product produced by the process of claim 7.

9. The process of preparing a polystyrene-methyl acrylate graft copolymer which comprises polymerizing methyl acrylate in the presence of a polystyrene hydroperoxide, said polystyrene hydroperoxide being the only free radical initiator present in the polymerization mixture and containing at least about 20 monomer units.

10. As a new composition of matter, the product produced by the process of claim 9.

11. The process of preparing a polyisopropyl-$\alpha$-methylstyrene-vinyl acetate graft copolymer which comprises polymerizing vinyl acetate in the presence of a polyisopropyl-$\alpha$-methylstyrene hydroperoxide, said polyisopropyl-$\alpha$-methylstyrene hydroperoxide being the only free radical initiator present in the polymerization mixture and containing at least about 20 monomer units.

12. As a new composition of matter, the product produced by the process of claim 11.

13. The process of preparing a graft copolymer of an isopropyl-$\alpha$-methylstyrene-methacrylic acid copolymer and styrene which comprises polymerizing styrene in the presence of a hydroperoxide of an isopropyl-$\alpha$-methylstyrene-methacrylic acid copolymer, said hydroperoxide of an isopropyl-$\alpha$-methylstyrene-methacrylic acid copolymer being the only free radical initiator present in the polymerization mixture and containing at least about 20 monomer units.

14. As a new composition of matter, the product produced by the process of claim 13.

15. The process of preparing a graft copolymer of an isopropyl-$\alpha$-methylstyrene-methacrylic acid copolymer and acrylamide which comprises polymerizing acrylamide in the presence of a hydroperoxide of an isoproply-$\alpha$-methylstyrene-methacrylic acid copolymer, said hydroperoxide of an isoproply-$\alpha$-methylstyrene-methacrylic acid copolymer being the only free radical initiator present in the polymerization mixture and containing at least about 20 monomer units.

16. As a new composition of matter, the product produced by the process of claim 15.

17. The process of preparing a polyisopropyl-$\alpha$-methylstyrene-methyl acrylate graft copolymer which comprises polymerizing methyl acrylate in the presence of a polyisopropyl-α-methylstyrene hydroperoxide, said polyisopropyl-α-methylstyrene hydroperoxide being the only free radical initiator present in the polymerization mixture and containing at least about 20 monomer units.

18. As a new composition of matter, the product produced by the process of claim 17.

References Cited in the file of this patent

UNITED STATES PATENTS

| | | |
|---|---|---|
| 1,975,959 | Lawson et al | Oct. 9, 1934 |
| 2,367,805 | Semple | Jan. 23, 1945 |
| 2,424,851 | Rudoff | July 29, 1947 |
| 2,525,628 | Young | Oct. 10, 1950 |
| 2,666,042 | Nozaki | Jan. 12, 1954 |
| 2,762,790 | Greene | Sept. 11, 1956 |

FOREIGN PATENTS

| | | |
|---|---|---|
| 679,562 | Great Britain | Sept. 17, 1952 |
| 999,594 | France | Oct. 3, 1951 |
| 818,693 | Germany | Oct. 25, 1951 |

OTHER REFERENCES

Metz et al., Jour. Polymer Science, vol. 16, pages 345–355 (1955).

Royals, "Advanced Organic Chemistry," page 420; copyrighted 1954 by Prentice-Hall, Englewood Cliffs, New Jersey.

Ser. No. 307,933, Moser (A. P. C.), published June 15, 1943.

U. S. DEPARTMENT OF COMMERCE
PATENT OFFICE

CERTIFICATE OF CORRECTION

Patent No. 2,837,496      Edwin J. Vandenberg      June 3, 1958

It is hereby certified that error appears in the printed specification of the above numbered patent requiring correction and that the said Letters Patent should read as corrected below.

Column 12, line 62, for "vinylidene" read -- vinylene --; column 14, line 49, for "acetylacetone" read -- acetylacetonate --; column 15, line 46, for "broard" read -- broad --; column 16, line 68, for "proply" read -- propyl --; line 69, for "isoproply" read -- isopropyl --.

Signed and sealed this 5th day of August 1958.

(SEAL)
Attest:

KARL H. AXLINE
Attesting Officer

ROBERT C. WATSON
Commissioner of Patents